Jan. 14, 1964 H. G. KING ETAL 3,118,117

MODULATORS FOR CARRIER COMMUNICATION SYSTEMS

Filed Oct. 10, 1960

Inventors
H.G.KING-S.R.PITKIN
By [signature]
Attorney 3,118,117

MODULATORS FOR CARRIER COMMUNICATION SYSTEMS

Howard Gurnos King and Sydney Richard Pitkin, London, England, assignors to International Standard Electric Corporation, New York, N.Y.

Filed Oct. 10, 1960, Ser. No. 61,553
Claims priority, application Great Britain Oct. 30, 1959
13 Claims. (Cl. 332—22)

Figures 1, 2:
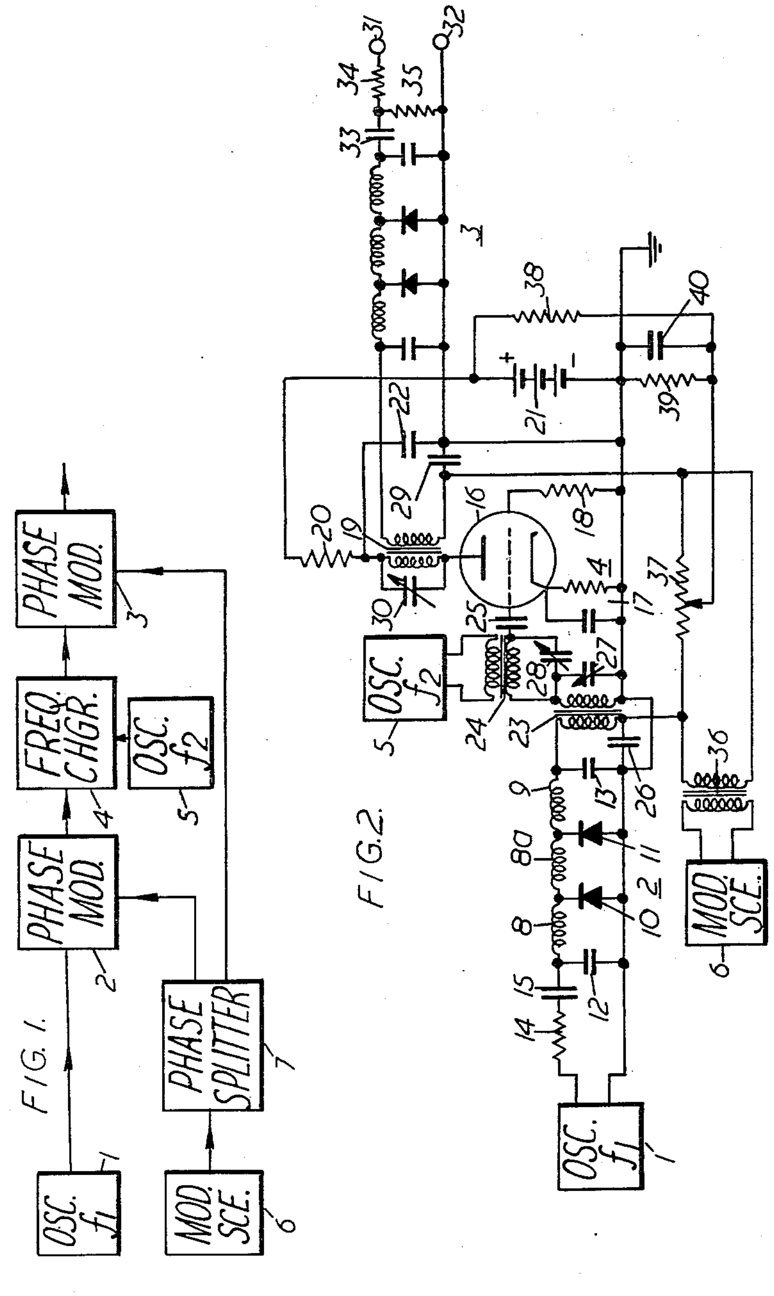

The present invention relates to phase modulators for carrier communication systems.

A number of different types of phase or frequency modulators have been proposed, but all of these have characteristics which are only approximately linear. For each type there is a limiting depth of modulation beyond which appreciable distortion is introduced. In some types which are favorable for other reasons, the limiting range of distortionless modulation is rather small. Thus, in order to obtain a sufficient degree of phase modulation a large number of stages of frequency multiplication must be employed. This arrangement is liable to produce spurious frequencies, tends to be bulky and expensive, and is unsuitable for use in mobile radio transmitters, for example.

The distortion introduced by the non-linear characteristics of phase modulators is of a harmonic type and it is the object of the present invention to provide a phase or frequency modulator circuit in which even harmonics, particularly the second harmonic, are substantially reduced or eliminated.

The invention will be described with reference to the accompanying drawing in which:

FIG. 1 shows a block schematic circuit diagram of an embodiment of the invention; and FIG. 2 shows circuit details of the embodiment.

Referring to FIG. 1, an oscillator 1 supplies waves of frequency $f_1$ to a phase modulator 2 which may be of any suitable type, though a variable delay line is preferred. The output of phase modulator 2 is connected to a second phase modulator 3 through a frequency changer 4 having a local oscillator 5 supplying carrier waves at a frequency $f_2$ greater than $f_1$. The lower sideband is selected from frequency changer 4.

A source 6 of a modulating wave is connected to control phase modulators 2 and 3 through a phase splitter 7 in such a manner that the modulating wave is applied to the phase modulators in opposite phases.

The two phase modulators 2 and 3 are operated respectively at frequencies $f_1$ and $f_2-f_1$ and it is necessary according to the invention that they should have the same modulation ratio. By "modulation ratio" is meant the ratio $d\varphi/ds$ where $ds$ is the change of applied modulating signal voltage or current which produces a change of phase $d\varphi$ of the wave being phase modulated. It is important to note that in some phase modulators the modulation ratio depends on the frequency of the wave being modulated.

Let the wave from the source 1 be given by $e_1 \sin \omega_1 t$, where $\omega_1=2\pi f_1$, and let the modulating wave from source 6 be given by $E \sin \omega t$. Then the wave at the output of phase modulator 2 will be given by $$e_1 \sin [\omega_1 t+\varphi+m_1 \sin \omega t+m_2 \sin 2\omega t +m_3 \sin 3\omega t+m_4 \sin 4\omega t+. . .]$$

where $m_1$, $m_2$, etc. are the phase-shift amplitudes corresponding to the fundamental frequency $\omega$ and to the harmonic frequencies $2\omega$, $3\omega$, etc. of the modulating wave.

Now let the wave from oscillator 5 be given by $e_2 \sin \omega_2 t$, where $\omega_2=2\pi f_2$. Thus, the lower sideband is selected from frequency changer 4, the output wave therefrom will be given by $$Ae_1e_2 \sin [\omega_2 t-\omega_1 t-\varphi-m_1 \sin \omega t-m_2 \sin 2\omega t -m_3 \sin 3\omega t-m_4 \sin 4\omega t-. . .]$$

where A is a constant.

This output wave from frequency changer 4 is again phase modulated by the modulating wave in phase modulator 3 with the phase of the modulating wave differing by 180° from that of the modulating wave applied to phase modulator 2. Thus, the modulating wave applied to phase modulator 3 is given by $E \sin (\omega t+\pi)$. The resultant modulated wave at the output of phase modulator 3 is given by $$Ae_1e_2 \sin [\omega_2 t-\omega_1 t-\varphi-m_1 \sin \omega t-m_2 \sin 2\omega t -m_3 \sin 3\omega t-m_4 \sin 4\omega t-. . . +m_1 \sin (\omega t+\pi)+m_2 \sin 2(\omega t+\pi) +m_3 \sin 3(\omega t+\pi)+m_4 \sin 4(\omega t+\pi)+. . .]$$

$$=Ae_1e_2 \sin [(\omega_2-\omega_1)t-\varphi -2m_1 \sin \omega t-2m_3 \sin 3\omega t-. . .]$$

In the above expression, the terms corresponding to the even harmonics cancel out leaving only those corresponding to the odd harmonics. In practice the third and higher harmonics will usually be of negligible amplitude.

While it has been assumed that the two phase modulators have identical characteristics, in practice this cannot easily be achieved. Therefore, complete cancellation of the even harmonics will not usually occur. Thus, means, not shown in FIG. 1, should preferably be provided to enable adjustment of the relative amplitudes of the modulating waves applied to the phase modulators so that cancellation of at least the second harmonics is achieved. A potentiometer 37, as shown in FIG. 2, can be used for this purpose. Some small residue of the other even harmonic will probably be left, but they will be of negligible amplitude.

The elements shown in FIG. 1 may be provided in any convenient way. However, FIG. 2 shows one possible detailed circuit in which phase modulators 2 and 3 are of the variable delay line type. Phase modulator 2 is shown as comprising three inductors 8, 8a and 9 connected in series, the junction points of which are connected to ground, as shown, through semiconductor devices 10, 11 which may be P-N junction rectifiers. Devices 10, 11 are biassed in the high resistance direction and act as variable capacitors whose capacity depends on the applied bias voltage. The two ends of the delay line are terminated by equal capacitors 12 and 13. The phase modulator 3 is similarly shown. It will be understood that while each delay line is shown as comprising three sections there may be any number of sections.

It should be pointed out that a delay line modulator is of the kind in which the modulation ratio depends on the frequency of the wave being modulated and for a given delay line will increase with increase of the said frequency. Thus, since the two phase modulators are operated at frequencies $f_1$ and $f_2-f_1$, which will generally be different, it will be clear that either the two delay lines will have a different number of sections, or the inductors and/or the capacitors of the sections will have different values in order that the two delay line modulators will both have the same modulation ratio.

It is, however, preferred that the two delay lines should be designed to introduce the same phase-shift per section and to have the same number of sections. It is also preferable that the two delay lines should have the same shunt capacities, in which case they will have different series inductances. It is believed that the minimum distortion occurs when the phase-shift per section is about 90°. In the special case in which $f_2=2f_1$, the two delay lines can be identical.

When rectifiers 10 and 11 are of the silicon type, the relation between the effective capacity C of the rectifier and the applied bias voltage V is approximately given by the equation $$C=K/\sqrt{V+v}$$

where K and $v$ are constants and $v$ is approximately equal to 0.4 volt. With this type of characteristic, the distortion produced by the non-linearity of the capacitors is mainly second harmonic distortion.

Oscillator 1 supplying waves of frequency $f_1$ is connected to phase modulator 2 through a resistor 14 and a capacitor 15 in series, the values of which are chosen to terminate the delay line by its characteristic impedance.

Frequency changer 4 comprises a valve 16 having its cathode connected to ground through a self-bias network 17 and its control grid connected to ground through a leak resistor 18. The anode is connected through the primary winding of an output transformer 19 and a decoupling resistor 20 to the positive terminal of the direct current operating source 21. A decoupling capacitor 22 is connected between the junction point of elements 19 and 20 and ground.

The outputs of phase modulator 2 and of local oscillator 5 are connected in series through input transformers 23 and 24 to the control grid of valve 16, a blocking capacitor 25 being interposed. A blocking capacitor 26 is also interposed between the ground conductor of phase modulator 2 and the lower end of the primary winding of transformer 23. The secondary windings of transformers 23 and 24 are provided with tuning capacitors 27 and 28, respectively, by which transformers 23 and 24 may be tuned to the frequencies $f_1$ and $f_2$, respectively.

The input of phase modulator 3 is connected to the secondary winding of output transformer 19. A blocking capacitor 29, corresponding to capacitor 26, is provided between the ground conductor and the secondary winding of transformer 19. An adjustable capacitor 30 shunts the primary winding of transformer 19 for tuning thereof to the frequency $f_2-f_1$. The output of phase modulator 3 is connected to two output terminals 31 and 32 through a matching network consisting of a series capacitor 33 and series and shunt resistors 34 and 35 as shown.

Modulating source 6 is connected to a transformer 36 which constitutes phase splitter 7 of FIG. 1. The terminals of the secondary winding of transformer 36 are bridged by a potentiometer 37 and are connected to the lower ends of the primary winding of transformer 23 and of the secondary winding of transformer 19 as shown. The movable contact of potentiometer 37 is connected to the junction point of resistors 38 and 39 connected in series across direct current source 21. Resistor 39 is connected to ground and is shunted by a by-pass capacitor 40.

The values of resistors 38 and 39 are chosen to provide a suitable mean bias potential for the rectifiers in phase modulators 2 and 3. It will be seen that the modulating voltage from source 6 will aid the mean bias voltage applied to one phase modulator and will oppose the mean bias voltage applied to the other phase modulator. This action cooperates to assure that the phases of modulation in the two modulators differ by 180° as required. The relative magnitude of the modulating voltages applied to the two phase modulators depends on the setting of potentiometer 37 which may be adjusted so that complete cancellation of the second harmonic occurs as explained above.

The values of the elements of FIG. 2 will be selected according to the requirements which have to be met as will be understood by those skilled in the art. However, to give an example, it may be stated that in a case in which modulating source 6 supplies a speech wave, the frequencies $f_1$ and $f_2$ were 4 and 40 megacycles per second and the phase modulated carrier wave appearing at terminals 31 and 32 had a frequency of 36 megacycles per second.

In this example delay line modulators 2 and 3 each had six sections with rectifiers 10 and 11 biassed to produce a capacity of 35 micro-microfarads. Terminal capacitors 12 and 13 had capacities of 18 micro-microfarads and the series inductors had inductances of 90 microhenries for the delay line of modulator 2 and 1.1 microhenries for the delay line of modulator 3. The characteristic impedance of the delay line of modulator 2 was about 1,600 ohms, and that of the delay line of modulator 3 was about 180 ohms.

With these values and using a modulating frequency of 1000 cycles with a phase deviation of ±115° the second harmonic distortion was reduced to about 1%, whereas by using a single delay line in the conventional way the second harmonic distortion would have been about 40%. With smaller phase deviations, of course, the second harmonic distortion will be less in both cases.

Another known type of variable delay line is one in which the shunt capacitors are of constant capacity and the series inductors have cores of variable permeability so that their inductance can be changed by the application of a suitable modulating current. It will be clear to those skilled in the art that the circuit of FIG. 2 could be adapted by minor modifications to employ this type of delay line.

It should be mentioned that other types of phase modulator controllable by a modulating current or voltage could be used in place of the delay line modulators shown in FIG. 2.

The phase modulating circuits shown in FIGS. 1 and 2 could be adapted to operate as frequency modulators; for example, by connecting an appropriate de-emphasis network between modulating source 6 and transformer 36 in FIG. 2.

While the principles of the invention have been described above in connection with specific embodiments, and particular modifications thereof, it is to be clearly understood that this description is made only by way of example and not as a limitation on the scope of the invention.

What we claim is:

1. An electric phase modulating arrangement for a carrier communication system comprising first and second wave generators for generating waves of frequencies $f_1$ and $f_2$, respectively, where $f_2$ is greater than $f_1$, first and second phase modulators, means for supplying the waves of frequency $f_1$ and a modulating wave to the first phase modulator, means for supplying the phase modulated waves at the output of the first phase modulator to a frequency changer to which the waves of frequency $f_2$ are also supplied, means for selecting the lower sideband of frequency $f_2-f_1$ from the frequency changer, and means for supplying the said sideband and the said modulating wave to the second phase modulator, in which the said first and second phase modulators have the same modulation ratio at frequencies $f_1$ and $f_2-f_1$, respectively, and in which the modulating wave is supplied to the said first and second modulators in respective phases which differ by 180° and with such relative amplitudes that at least the second harmonic distortion of the phase modulated waves at the output of the second phase modulator resulting from the non-linearity of the characteristics of the phase modulators is substantially eliminated.

2. An arrangement according to claim 1 in which each of the said phase modulators comprises a delay line, and in which means is provided for applying the modulating wave to vary the impedance of one or more elements of the delay line.

3. An arrangement according to claim 2 in which each delay line comprises one or more shunt elements consisting of semiconductor devices, means for biassing the semiconductor devices in such manner that they act as variable capacitors, and means for applying the modulating wave in such manner that it increases the bias in one modulator, and reduces the bias in the other.

4. An arrangement according to claim 3 in which the modulating wave is supplied through a phase-splitting transformer having the terminals of its secondary winding connected respectively to the two delay lines, and in which an adjustable potentiometer is connected across the said secondary winding with the movable contact connected to a source of a constant unidirectional bias potential.

5. An electric phase modulating arrangement comprising a first wave generator for generating waves having a first frequency, a second wave generator for generating waves having a second frequency different than said first frequency, a first phase modulator, a second phase modulator, a source of modulating waves, means coupled to said first generator to couple waves of said first frequency to said first modulator, means coupled to said source to couple said modulating wave with a given phase to said first modulator, a frequency changer coupled to the output of said first modulator, means coupled to said second generator to couple waves of said second frequency to said frequency changer, means coupled to said frequency changer to couple the lower sideband frequency at the output thereof to said second modulator, and means coupled to said source to couple said modulating wave with a phase opposite to said given phase to said second modulator to substantially eliminate the second harmonic distortion of the phase modulated wave at the output of said second modulator resulting from the non-linearity of the characteristics of said first and second modulators.

6. An electric phase modulating arrangement according to claim 5, wherein said modulating wave coupled to said first modulator and said modulating wave coupled to said second modulator have a 180° phase relationship and a predetermined relative amplitude.

7. An electric pulse modulating arrangement according to claim 5, wherein said first and second modulators have the same modulation ratio at said first frequency and at said lower sideband frequency.

8. An arrangement according to claim 7, wherein said modulating wave coupled to said first modulator and said modulating wave coupled to said second modulator have a 180° phase relationship and a predetermined relative amplitude.

9. An arrangement according to claim 5, wherein each of said modulators includes a delay line having at least one shunt element consisting of a rectifier, means for biasing said rectifier to cause said rectifier to act as a variable capacitor, and means for applying said modulating wave to said rectifier to increase the bias of said rectifier of one of said modulators and reduce the bias of said rectifier of the other of said modulators.

10. An arrangement according to claim 9, wherein said means for applying said modulating wave includes a phase-splitting transformer having one terminal of its secondary winding connected to one of said delay lines and the other terminal of its secondary winding connected to the other of said delay lines, and a potentiometer connected across said stationary winding with the movable contact thereof being connected to a source of bias potential.

11. An arrangement according to claim 5, wherein each of said phase modulators includes a delay line having at least one element therein whose impedance is varied by said modulating wave.

12. An arrangement according to claim 11, wherein each of said delay lines includes at least one shunt element consisting of a rectifier, means for biasing said rectifier to cause said rectifier to act as a variable capacitor, and means for applying said modulating wave to said rectifier to increase the bias of said rectifier of one of said modulators and reduce the bias of said rectifier of the other of said modulators.

13. An arrangement according to claim 12, wherein said means for applying said modulating wave includes a phase-splitting transformer having one terminal of its secondary winding connected to one of said delay lines and the other terminal of its secondary winding connected to the other of said delay lines, and a potentiometer connected across said secondary winding with the movable contact of said potentiometer connected to a source of bias potential.

References Cited in the file of this patent

UNITED STATES PATENTS 2,358,152 Earp ------------------ Sept. 12, 1944

FOREIGN PATENTS 675,439 Great Britain ----------- July 9, 1952